W. P. LIMACHER.
BUMPER BRACKET.
APPLICATION FILED JUNE 20, 1921.

1,407,350. Patented Feb. 21, 1922.

WALTER P. LIMACHER INVENTOR.

BY Hazard & Miller
ATTORNEYS.

UNITED STATES PATENT OFFICE.

WALTER P. LIMACHER, OF PASADENA, CALIFORNIA.

BUMPER BRACKET.

1,407,350.　　　　Specification of Letters Patent.　Patented Feb. 21, 1922.

Application filed June 20, 1921. Serial No. 479,067.

*To all whom it may concern:*

Be it known that I, WALTER P. LIMACHER, a citizen of the United States, residing at Pasadena, in the county of Los Angeles and State of California, have invented new and useful Improvements in Bumper Brackets, of which the following is a specification.

This invention is a bumper bracket for automobiles and the like which is so arranged as to permit of the usual pivotal adjustment of the projecting arms of the brackets, while also permitting of slight pivotal adjustment of the projecting arms upon axes at right angles to the main pivotal connection, and as a consequence a universal adjustment is provided for the projecting arms of the brackets.

The invention will be readily understood from the following description of the accompanying drawings, in which—

Figure 1:
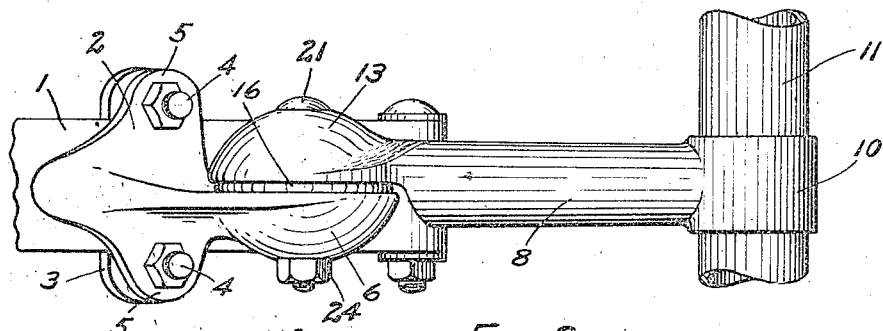
Figure 1 is a plan view of one of the bumper brackets in operative position.
Figure 2:
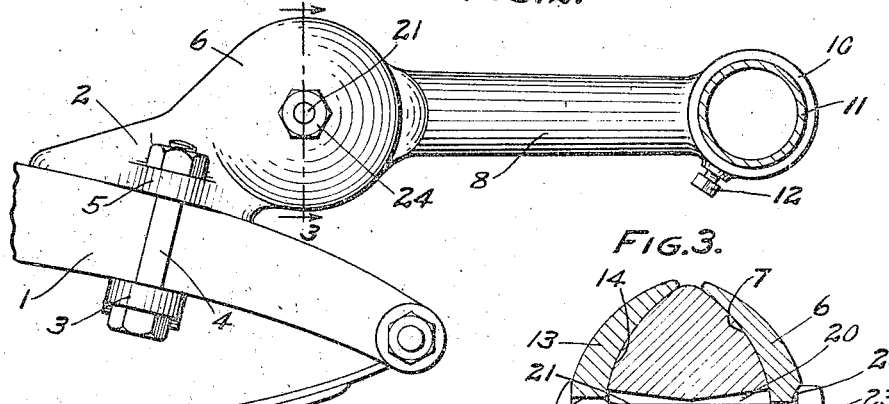
Fig. 2 is a side elevation of the same.
Figure 3:
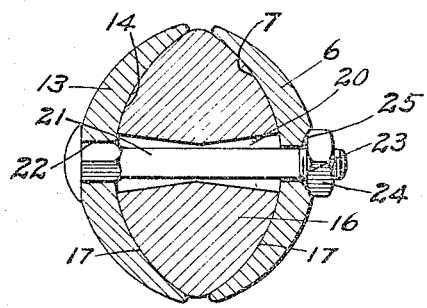
Fig. 3 is a transverse section on the line 3—3 of Fig. 2.

The bumper brackets are arranged at the respective sides of an automobile in usual manner, preferably upon the ends of side frames 1 of the automobile, and each bracket includes a support secured to said side frame, and a projecting arm adapted to engage the end of the bumper.

The support of a bracket, which is secured to the side frame 1, is shown as including a base 2 connected to frame 1 by a usual clip 3 having retaining bolts 4 extending through lugs 5 upon the base 2. The bearing members 6 extends forwardly from base 2 and is provided upon its inner surface with a concave recess 7.

The projecting arm of the bracket is preferably a hollow tube 8 terminating in a bearing collar 10 adapted to receive the end of the bumper 11 which may be secured in the bearing collar by means of a usual set screw 12. The rear end of tube 8 is arranged as a bearing member 13 co-operating with the bearing member 6 and arranged alongside of the same. The bearing member 13 is provided with an inner concave surface 14.

Figure 4:
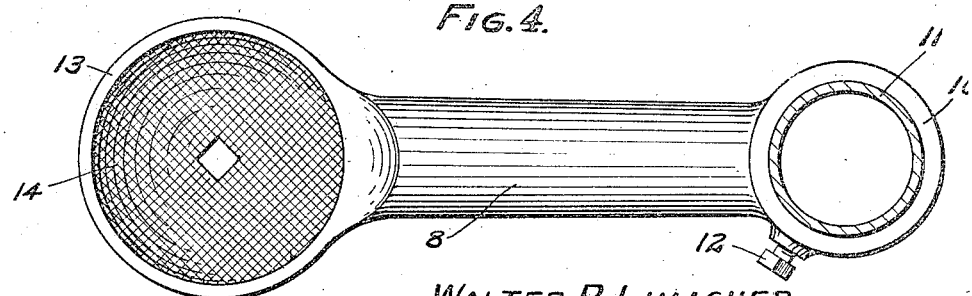
Fig. 4 is a side elevation of the projecting arm of a bracket removed from the supporting member secured to the automobile frame.

A member 16 is received between the co-operating bearings 6 and 13 and is provided with opposite convex surfaces 17 adapted to engage the concave surfaces 7 and 14. These convex surfaces of member 16 are preferably roughened or knurled as shown in Fig. 4, in order that a frictional clamping engagement may be provided between the member 16 and the bearing ends of the bracket support and its projecting arm.

The member 16 is apertured in order to receive a pivot bolt, and said aperture is of somewhat greater diameter than the pivot bolt and convergently tapers toward its center from both outer surfaces as shown at 20. The pivot bolt 21 is received through its aperture and through axial openings 22 and 23 provided in bearing members 13 and 6. A usual nut 24 is received upon the end of the bolt projecting through opening 23 of bearing member 6, and said opening is preferably recessed at its outer end as shown at 25 in order to receive said nut so as to permit slight tilting of the bolt in the opening 23.

It will be noted that tightening of the pivot bolt will clamp the bearing members 6 and 13 with relation to one another so as to position the projecting arms 6 of the bumper brackets as desired, and it will be further noted that the specific pivotal connection provided permits of slight universal adjustment of projecting arms 8, since the bearing member 13 of the projecting arm may be not only pivotally adjusted upon bolt 21, but may be also adjusted to a certain extent upon the convex surface of member 16.

The enlargement of the aperture of member 16 relative to bolt 21 as well as the recess 25 provided for nut 24 permits of such shifting of the pivot bolt and bearing member 13 with relation to bearing member 6 and the member 16, while at the same time the tightening of the pivot bolt will positively clamp the bearing member 13 in its universally adjusted position.

Various changes may be made without departing from the spirit of the invention as claimed.

What is claimed is:

1. A bumper bracket comprising a support, a bumper supporting arm, and a universal joint connection between said arm and support.

2. A bumper bracket comprising a support, a projecting arm, a pivotal connection between said arm and support including a bearing member having opposite convex surfaces, and a pivot bolt extending through the same and through said arm and support.

3. A bumper bracket comprising a support, a projecting arm, said arm and support having facing concave surfaces, and a bearing member received between said surfaces and having opposite convex surfaces.

4. A bumper bracket comprising a support, a projecting arm, said arm and support having facing concave surfaces, a bearing member received between said surfaces and having opposite convex surfaces, and a pivot bolt received through said bearing member and said support and arm.

5. A bumper bracket comprising a support, a projecting arm, said arm and support having facing concave surfaces, a bearing member received between said surfaces and having opposite convex surfaces, and a pivot bolt received through said bearing member and said support and arm, said bearing member having an enlarged opening adapted to loosely receive said bolt.

6. A bumper bracket comprising a support, a projecting arm, said arm and support having facing concave surfaces, a bearing member received between said surfaces and having opposite convex surfaces, and a nut received upon said bolt, the outer surface of one of said parts being recessed to receive said nut so as to permit of tilting of said pivot bolt.

7. A bumper bracket comprising a support, a projecting arm, said arm and support having facing concave surfaces, a bearing member received between said surfaces and having opposite convex surfaces, and a pivot bolt received through said bearing member and said support and arm, said bearing member having an enlarged opening convergently tapering toward its center and adapted to loosely receive said bolt.

8. A bumper bracket comprising a support, a projecting arm, and a pivotal connection between said arm and support including a bearing member having opposite convex surfaces and received between said arm and support, said convex surfaces being roughened to provide a frictional clamping connection.

9. A bumper bracket comprising a support, a bumper carrying arm, a universal joint between said support and arm, and means for locking the parts of the joint against relative movement.

10. A bumper bracket comprising a support, a bumper carrying arm, a bearing member between said support and arm, which bearing member is constructed so as to permit universal movement of the arm relative to the support and fastening means passing through said support, said arm and the intermediate member.

In testimony whereof I have signed my name to this specification.

WALTER P. LIMACHER.